March 27, 1928.  J. B. KELLY  1,664,217
SCALE
Filed Dec. 15, 1926  2 Sheets-Sheet 1
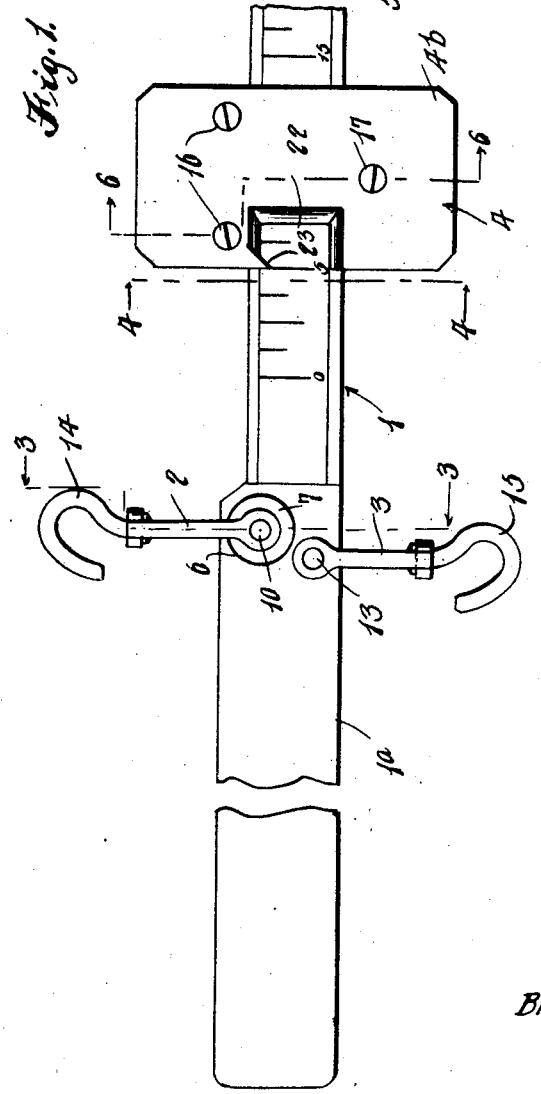
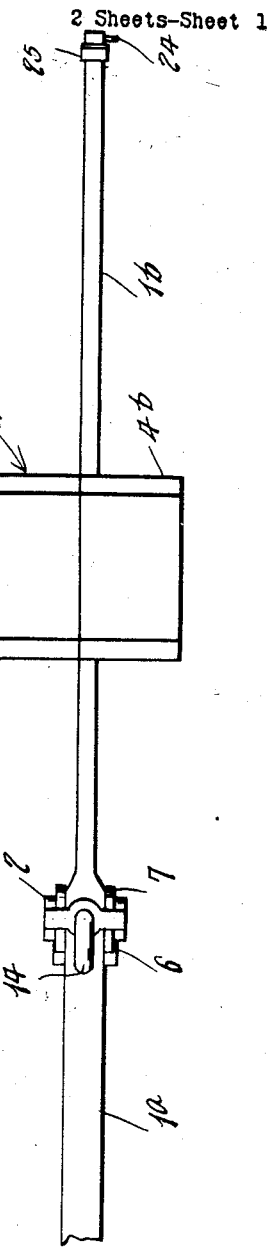
INVENTOR.
J. B. Kelly,
BY
ATTORNEY March 27, 1928.  
J. B. KELLY  
SCALE  
Filed Dec. 15, 1926  
1,664,217  
2 Sheets-Sheet 2
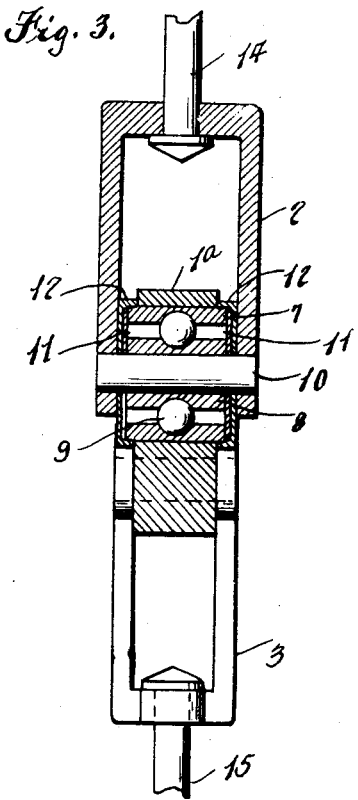
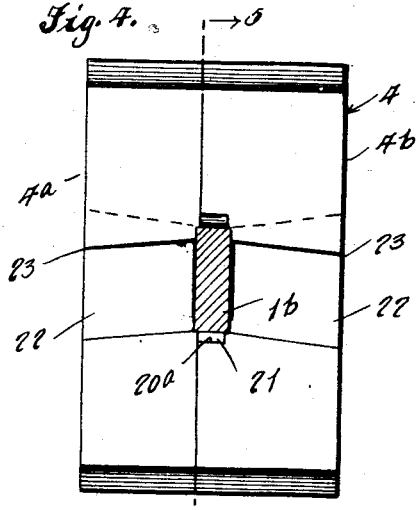
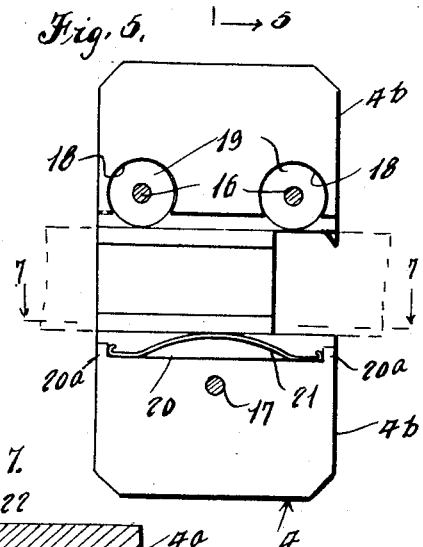
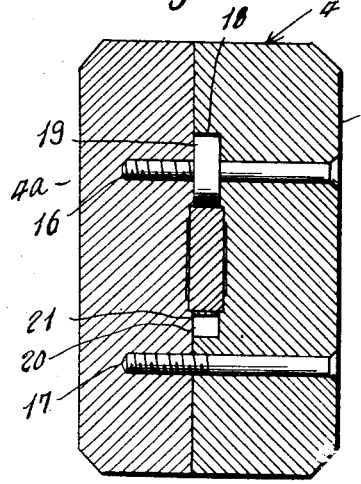
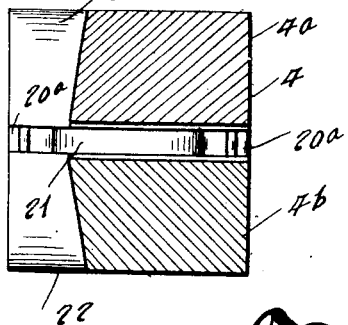
INVENTOR.  
J. B. Kelly,  
BY  
ATTORNEY Patented Mar. 27, 1928.

1,664,217

UNITED STATES PATENT OFFICE.

JOHN B. KELLY, OF HARLINGEN, TEXAS.

SCALE.

Application filed December 15, 1926. Serial No. 154,979.

This invention relates to scales of that type comprising a graduated beam, a beam suspending clevis, a load suspending clevis, and a balancing weight slidably mounted upon the beam.

The invention has for one of its objects to provide a structure of the character stated wherein the beam shall be connected to the suspending clevis in a manner to insure its free and easy movement, such connection being preferably established through the medium of a bearing having inner and outer races extending through the beam and of which the latter is fixed to the beam, and a fulcrum pin fixed to the inner race and to the beam suspending clevis.

A further object of the invention is to provide a structure of the character stated wherein the bearing shall be provided with means adapted to exclude dust, water and other foreign matter therefrom and to retain a lubricant therein.

A further object of the invention is to provide a structure of the character stated wherein the balancing weight, while capable of being freely moved thereon, shall be mounted on the beam in a manner to prevent any casual movement thereof with respect to the beam, and to attain this end the invention comprehends the employment of rollers and a spring carried by the balancing weight and contacting with the beam.

A further object of the invention is to provide a structure of the character stated wherein the beam shall be provided with means adapted to prevent the removal of the balancing weight therefrom, and wherein the weight shall be constructed in sections to permit of the application thereto of the rollers and spring.

A still further object of the invention is to provide a structure of the character stated wherein the beam shall be provided on each side thereof with scale graduations and wherein the balancing weight shall be provided with indicating points so as to permit the operator to stand at either side of the device.

The invention is hereinafter fully described and claimed, and illustrated in the accompanying drawings, wherein:

Figure 1 is a view in side elevation of scales constructed in accordance with my invention, Figure 2 is a top plan view of the scales, Figure 3 is a sectional view taken on the vertical planes indicated by the line 3—3 of Figure 1, Figure 4 is a sectional view taken on the vertical plane indicated by the line 4—4 of Figure 1, Figure 5 is a sectional view taken on the vertical plane indicated by the line 5—5 of Figure 4, Figure 6 is a sectional view taken on the vertical planes indicated by the line 6—6 of Figure 1, and Figure 7 is a similar view taken on the horizontal plane indicated by the line 7—7 of Figure 5.

Corresponding and like parts are referred to in the following description, and designated in the several views of the accompanying drawings, by similar reference characters.

In the drawings, 1 designates the beam, 2 the beam suspending clevis, 3 the load suspending clevis, and 4 the sliding weight of the scales.

The short arm 1$^a$ of the beam 1 is thicker and wider than the long arm 1$^b$ thereof and said long arm is provided on both sides thereof with graduations 5. The scale is especially adapted for use in the field, and the object in making the arm 1$^a$ shorter than the arm 1$^b$ is for convenience in working around the scale. Adjacent its inner end and upper edge, the beam arm 1$^a$ is provided with a circular opening 6 in which is mounted a bearing comprising an outer race 7, inner race 8 and anti-friction elements 9. The outer race 7 is fixed to the beam arm 1$^a$ in any suitable manner, and the fulcrum pin 10 of the beam 1, which passes through the inner race 8, is fixed to said race and to the beam suspending clevis 2 in any suitable manner. The races 7 and 8 extend beyond the sides of the beam arm 1$^a$, and the ends thereof are closed by felt or other suitable washers 11 to exclude dust, water and other foreign matter from and retain a lubricant in the bearing. The washers 11 are secured in place by caps 12 which are mounted upon the fulcrum pin 10 between the sides of the beam suspending clevis 2 and the ends of the races 7 and 8 and which contact with the ends of the race 7.

One of the anti-friction elements 9 is positioned vertically above the fulcrum pin 10 and constitutes the actual fulcrum on which the beam 1 rocks. As the beam 1 rocks upon but one of the anti-friction elements, its free and easy movement is insured. The fixing of the outer race 7 to the beam 1, the fixing of the fulcrum pin 10 to the inner race 8 and beam suspending clevis 2, and the exclusion of foreign matter from the bearing and the retention of a lubricant therein, also contribute toward insuring the free and easy movement of the beam.

The load suspending clevis 3 is connected to the beam arm $1^a$ by pin 13 which is fixed in any suitable manner to the clevis and has a slight play in the opening of the beam arm $1^b$ through which it passes. The clevises 2 and 3 are provided with the usual hooks 14 and 15, respectively, and said hooks are swivelly connected to the clevises.

The sliding weight 4 consists of sections $4^a$ and $4^b$ which are secured together by machine screws 16 and 17, the screws 16 being located above and the screw 17 below the beam arm $1^b$. The weight section $4^b$ is provided at its inner face and above the beam arm $1^b$ with circular recesses 18 for the reception of rollers 19 which contact with the upper edge of said arm. In said face thereof and below the beam arm $1^b$, the weight section $4^b$ is provided with an elongated recess 20 for the reception of a leaf spring 21 which contacts with the lower edge of this beam arm. The spring 21 is retained in place by the end walls $20^a$ of the recess 20. The screws 16 pass through the recesses 18 and function as axles for the rollers 19. The rollers 19 enable the sliding weight to be readily adjusted on the beam arm $1^b$, and the spring 21 holds the sliding weight against casual movement on said arm and thus insures its retention in the position into which it has been adjusted.

The graduations 5 on both sides of the beam arm $1^b$ are similar. To prevent the sliding weight 4 which only contacts with the sides of the beam arm $1^b$ at points adjacent the upper and lower edges of said arm from marring them, the graduations 5 are spaced from the upper and lower edges of the beam arm $1^b$, as shown in Figure 1. The sliding weight 4 is provided in its opposite sides with recesses 22 and with indicating points 23.

To prevent the removal of the sliding weight 4 from the beam arm $1^b$, the outer end of said arm is provided with a stop pin 24, and to prevent the weight from being damaged by said pin a cushioning member 25 is mounted upon the beam arm $1^b$ inwardly of the pin. If desired the outer end of the beam arm $1^b$ may be provided with a pin 26 to permit of an auxiliary weight 27 to be connected to said arm by means of a hook 28.

It should be understood that the drawings are merely illustrative and do not pretend to give exact proportions. Furthermore, the said drawings are illustrative of a preferred construction, it being my expectation that various changes and modifications may be made without departing from the spirit and scope of my invention.

What is claimed is:—

1. Scales, comprising a beam provided with an opening, inner and outer bearing races extending through the opening, anti-friction elements positioned between the races, a fulcrum pin extending through the inner race, a beam suspending clevis connected to the fulcrum pin, washers closing the ends of the bearing races, a balancing weight slidably mounted upon the beam, and a load suspending element pivoted to the beam.

2. Scales comprising a beam having long and short arms of which the latter is thicker and wider than the former, the short arm having an opening extending transversely therethrough, inner and outer bearing races extending through the opening and of which the latter is fixed to the beam, anti-friction elements positioned between the bearing races, a fulcrum pin extending through and fixed to the inner bearing race, a beam suspending clevis fixed to the fulcrum pin, washers positioned upon the fulcrum pin and contacting with and closing the ends of the bearing races, caps mounted upon the fulcrum pin outwardly beyond the washers and contacting with the ends of the outer bearing race, a balancing weight slidably mounted upon the beam, and a load suspending clevis pivoted to the beam.

3. Scales comprising a graduated beam, a suspending element therefor, a load suspending element pivoted to the beam, a weight slidably mounted upon the beam and provided with an indicating point cooperating with the graduations of the beam, rollers journaled in the weight and contacting with the upper edge of the beam, and a spring arranged within the weight and contacting with the lower edge of the beam.

4. Scales comprising a graduated beam, a suspending element therefor, a load suspending element pivoted to the beam, a sectional weight slidably mounted upon the beam and provided with an indicating point, one of the weight sections being provided above the beam with recesses and below the beam with a recess, elements securing the weight sections together and certain of said elements passing through the upper recesses, rollers journaled on said certain elements and located in the upper recesses and contacting with the upper edge of the beam, a spring positioned in the lower recess and contacting with the lower edge of the beam.

5. Scales comprising a graduated beam, a suspending element therefor, a load suspending element pivoted to the beam, a balancing weight slidably mounted upon the beam and provided with an indicating point, a cushion mounted upon and surrounding the beam, and a pin carried by the beam for retaining the cushion in place.

In testimony whereof I affix my signature.

JOHN B. KELLY.